United States Patent [19]
Yoshida et al.

[11] Patent Number: 5,654,953
[45] Date of Patent: Aug. 5, 1997

[54] OPTICAL DISK AND METHOD OF MANUFACTURING THE SAME

[75] Inventors: Nobuhisa Yoshida, Zushi; Katsumi Suzuki, Tokyo, both of Japan

[73] Assignee: Kabushiki Kaisha Toshiba, Kawasaki, Japan

[21] Appl. No.: 531,307

[22] Filed: Sep. 20, 1995

[30] Foreign Application Priority Data

Sep. 21, 1994 [JP] Japan .................. 6-227098
Sep. 21, 1994 [JP] Japan .................. 6-227106

[51] Int. Cl.⁶ ..................................... G11B 7/24
[52] U.S. Cl. ........................... 369/275.1; 369/275.3
[58] Field of Search ........................... 369/116, 48, 47, 369/54, 58, 59, 275.3, 275.1, 275.4

[56] References Cited

U.S. PATENT DOCUMENTS

| | | | |
|---|---|---|---|
| 5,111,443 | 5/1992 | Yokogawa | 369/48 |
| 5,327,411 | 7/1994 | Iwasa et al. | 369/59 |
| 5,345,434 | 9/1994 | Ide et al. | 369/59 |
| 5,347,505 | 9/1994 | Moritsuga et al. | 369/59 |
| 5,400,318 | 3/1995 | Nakayama et al. | 369/59 |
| 5,428,594 | 6/1995 | Izumi et al. | 369/116 |
| 5,483,513 | 1/1996 | Fuji | 369/124 |
| 5,533,003 | 7/1996 | Kobayashi | 369/275.4 |
| 5,537,381 | 7/1996 | Fuji | 369/59 |

*Primary Examiner*—Nabil Hindi
*Attorney, Agent, or Firm*—Cushman, Darby & Cushman IP Group of Pillsbury Madison & Sutro LLP

[57] ABSTRACT

The present invention relates to an optical disk and a method of manufacturing the same, and, more particularly, to an optical disk which can ensure high-density recording and a method of pre-formatting this optical disk. This optical disk has a surface on which data is retrieved with a focused light beam and a light beam spot of a predetermined size is formed by the focused light beam, and comprises a first pit group having a plurality of unit pits of a unit pit length arranged in such a manner that adjoining unit pits are separated from each other with a blank of a first blank length, the blank being smaller than a size of the beam spot, the first blank length being set shorter than the unit pit length, and a second pit group following the first pit group and having a plurality of data pits whose lengths are substantially integer multiples of the unit pit length, the data pits being separated from one another with a blank of a second blank length.

27 Claims, 10 Drawing Sheets

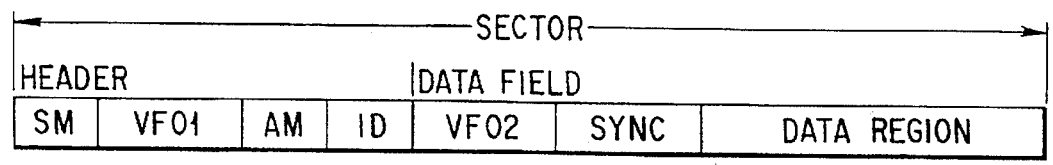
FIG. 2
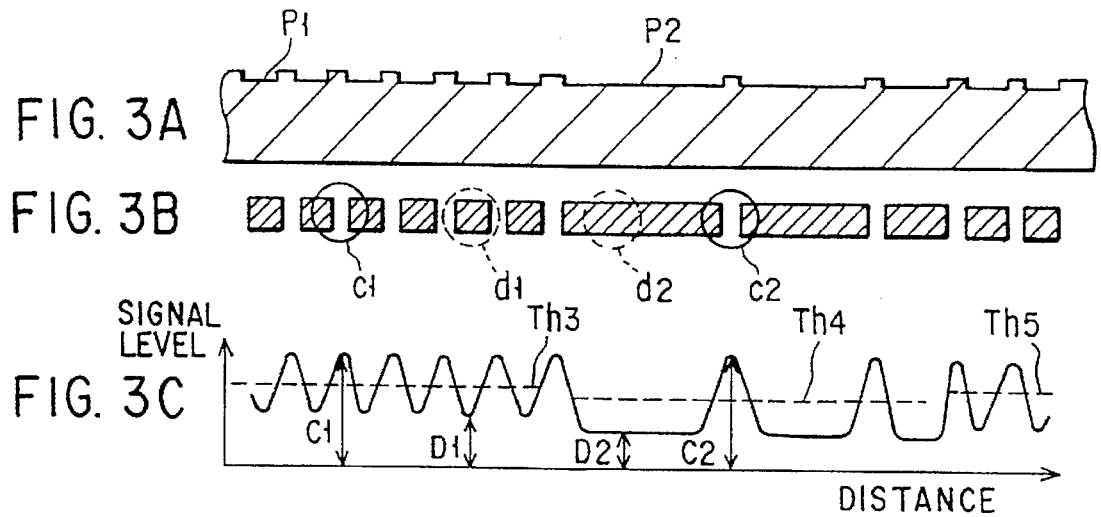
FIG. 3A
FIG. 3B
FIG. 3C
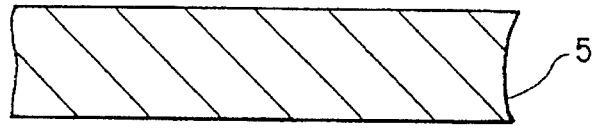
FIG. 4A
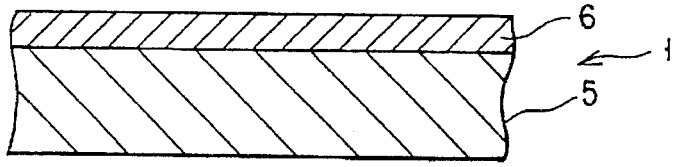
FIG. 4B
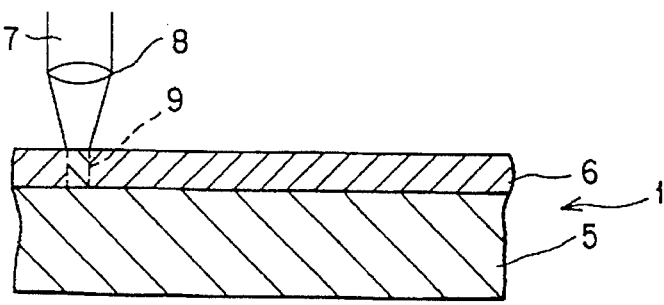
FIG. 4C
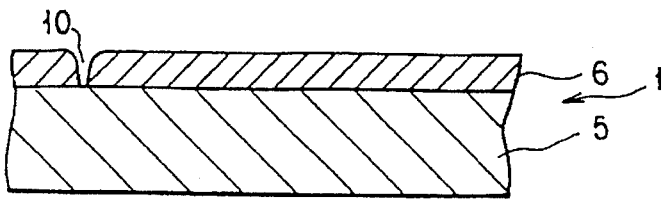
FIG. 4D

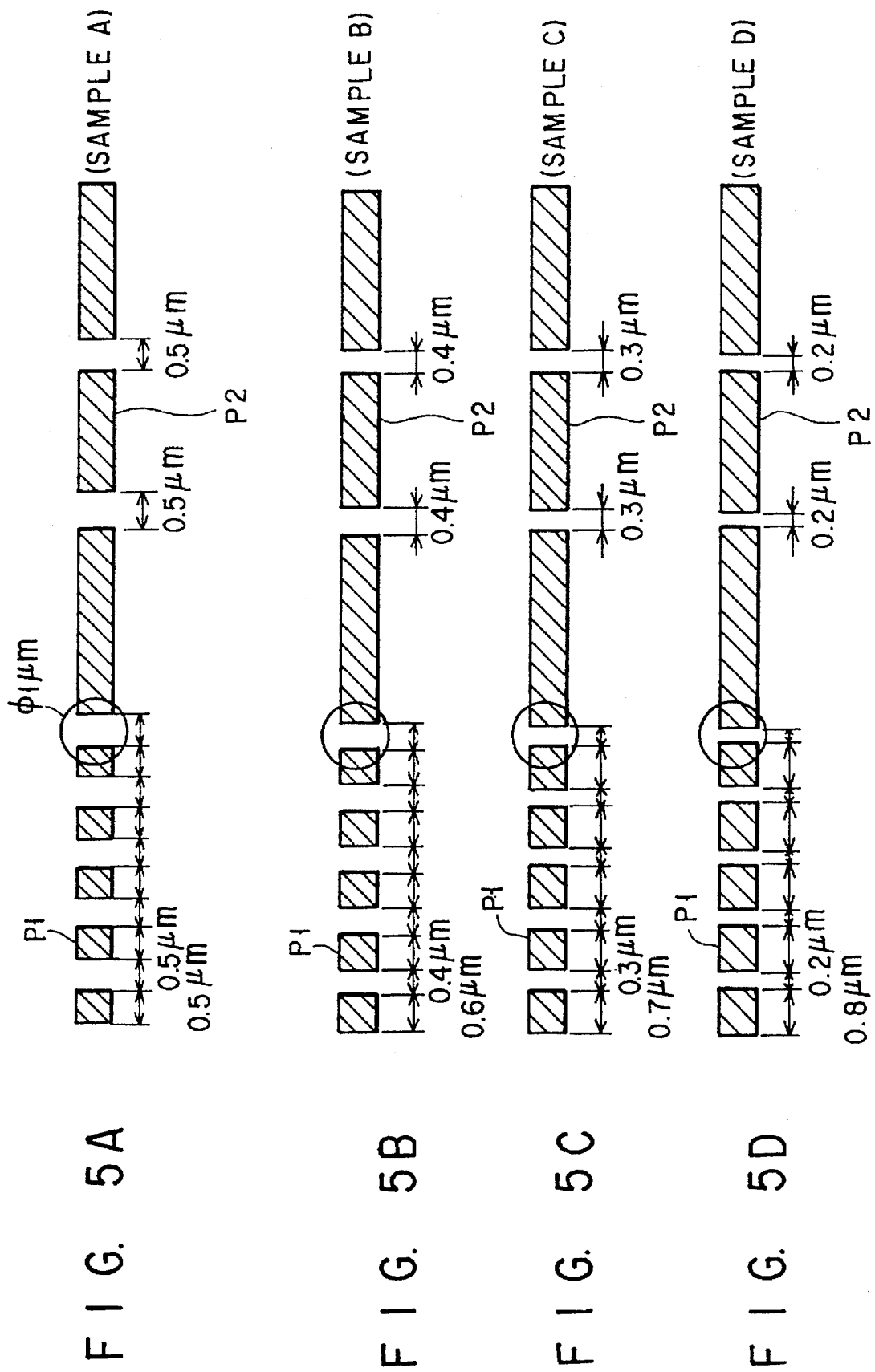

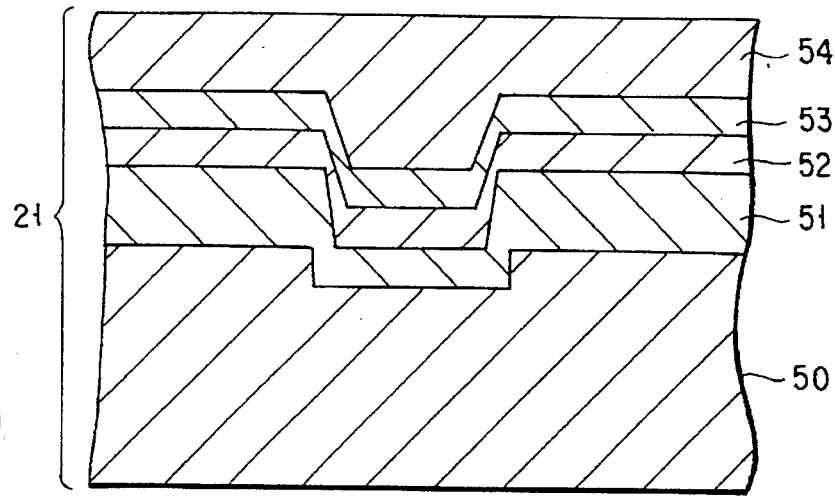
FIG. 9
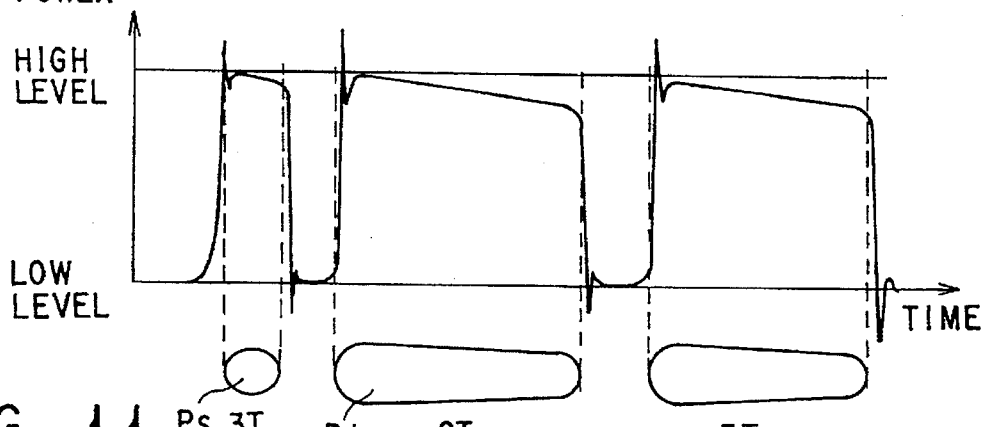
FIG. 11
| RATE OF CHANGE IN EXPOSING POWER : R (mw/μsec) | -0.3 | -0.5 | -1.0 | -1.5 | -2.0 | -2.5 | -3.0 | -5.0 | -8.0 | -10 |
|---|---|---|---|---|---|---|---|---|---|---|
| REPRODUCTION ERROR | △ | △ | △ | ○ | ○ | ○ | ○ | × | × | × |
FIG. 12

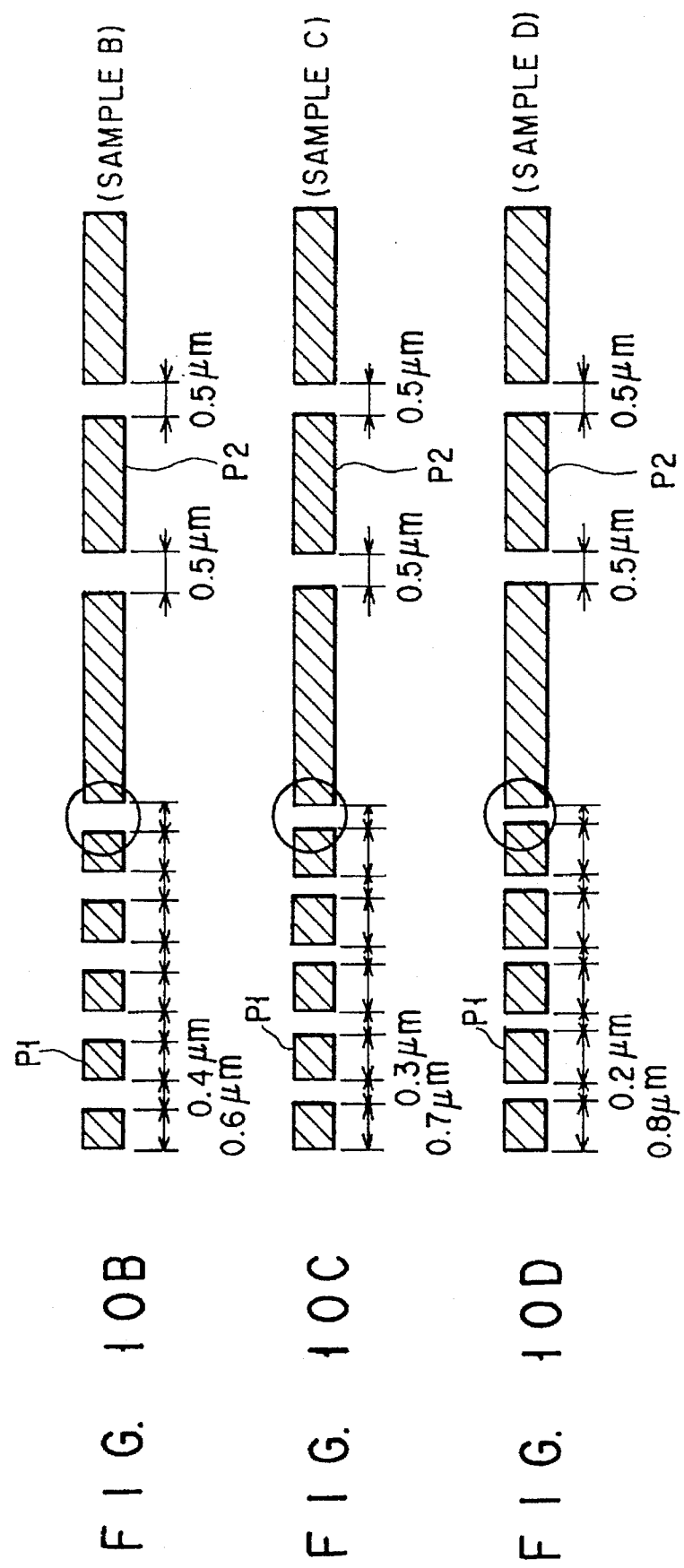
FIG. 10A (SAMPLE A)
FIG. 10B (SAMPLE B)
FIG. 10C (SAMPLE C)
FIG. 10D (SAMPLE D)

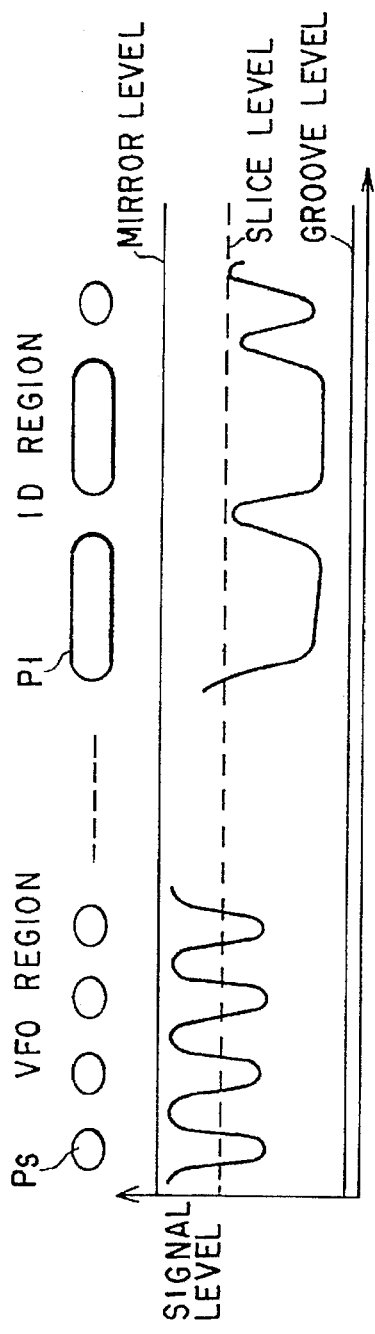
FIG. 13A
FIG. 13B
(R=-0.3)
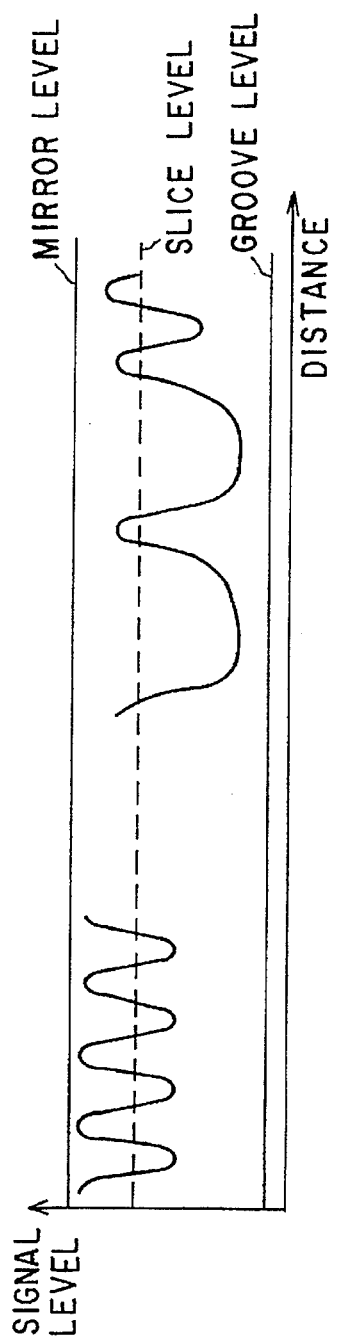
FIG. 13C
(R=-2.0)
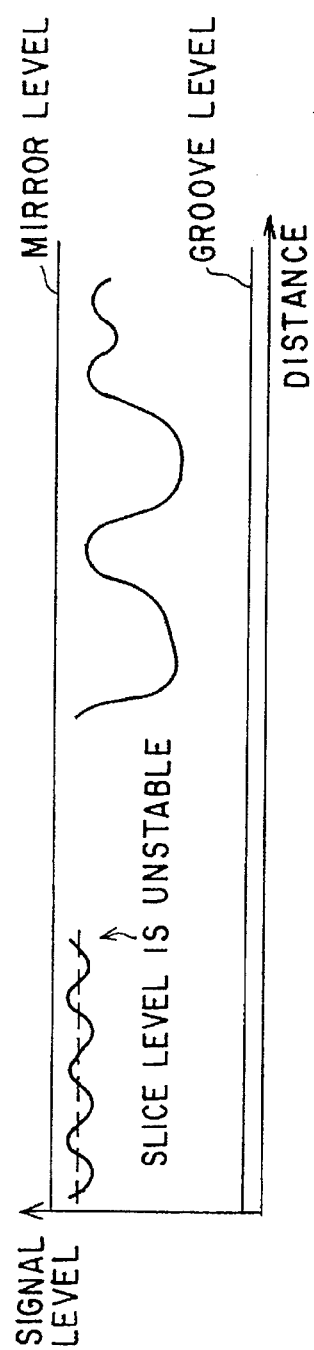
FIG. 13D
(R=-10)

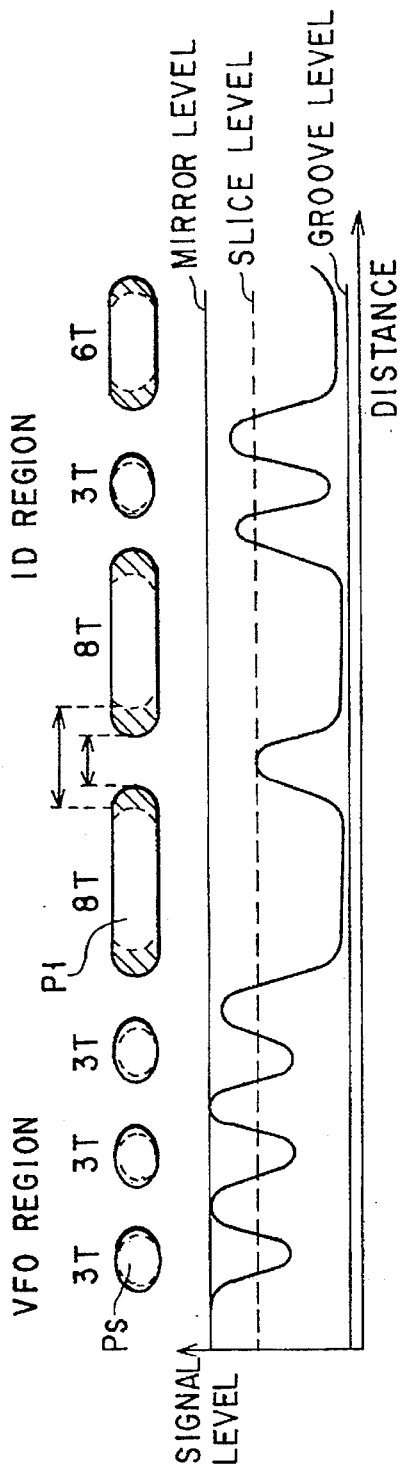
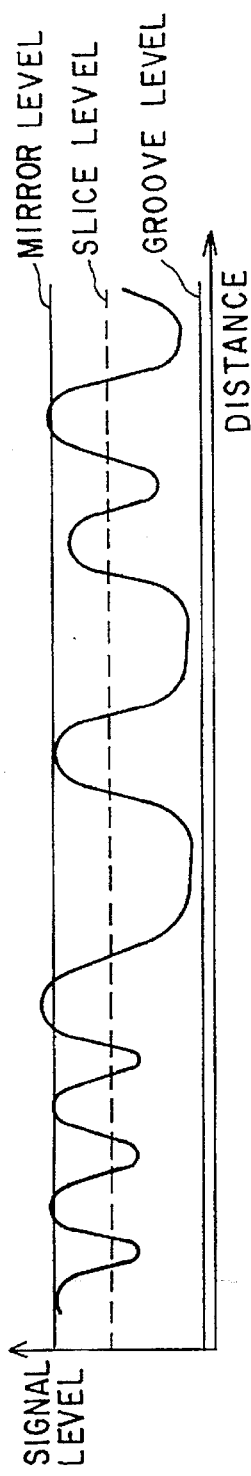
FIG. 14A  FIG. 14B  FIG. 14C

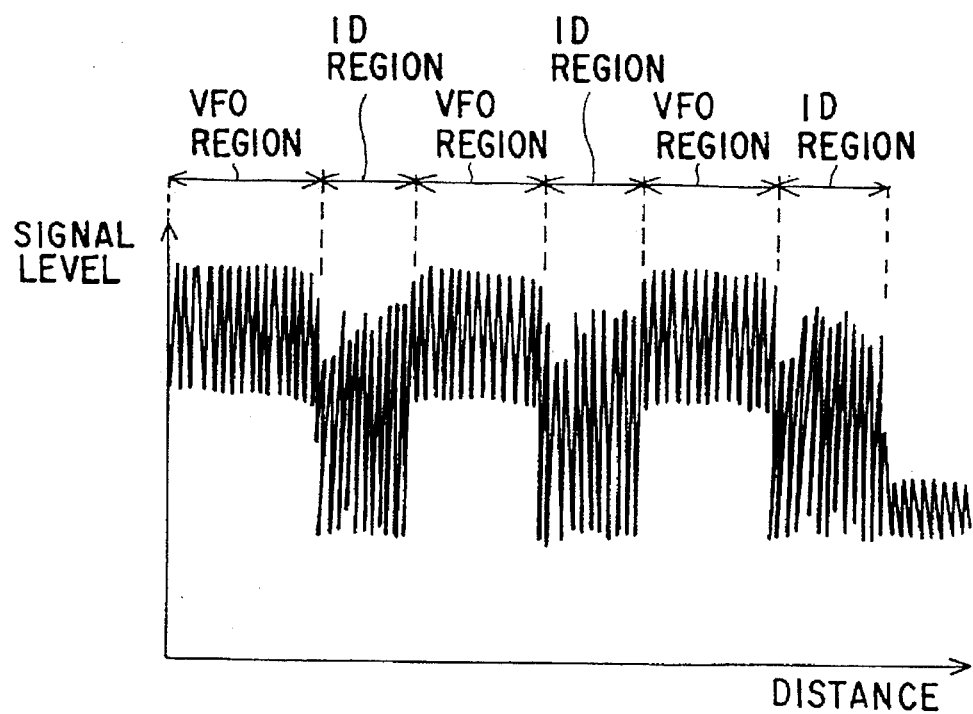
F I G. 15A
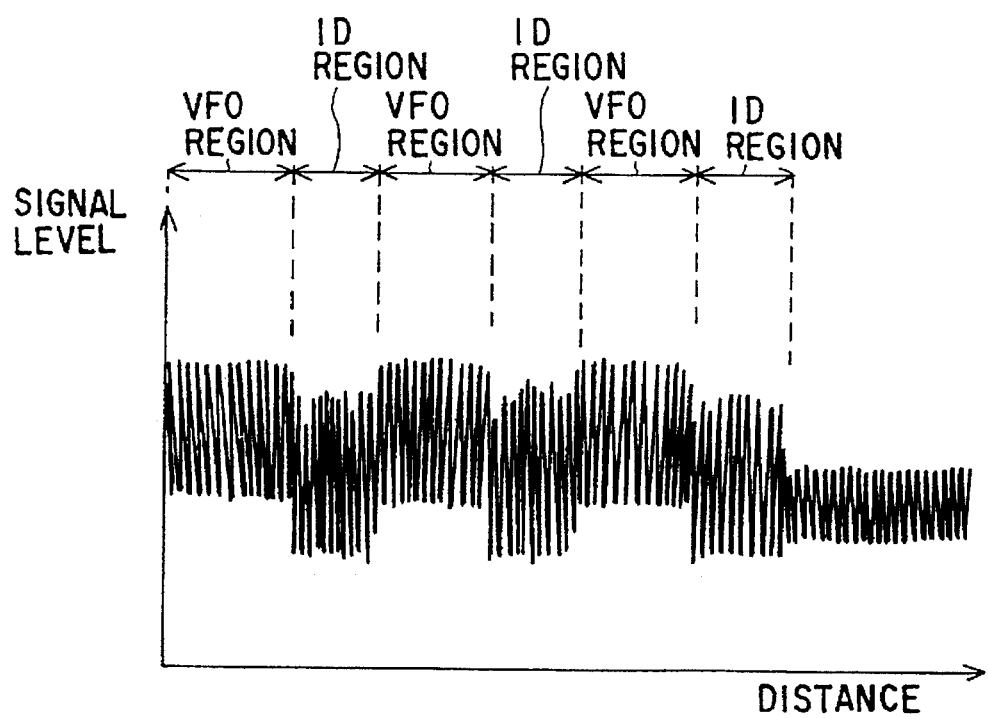
F I G. 15B

OPTICAL DISK AND METHOD OF MANUFACTURING THE SAME

BACKGROUND OF THE INVENTION

1. Field of the Invention

The present invention relates to an optical disk and a method of manufacturing the same, and, more particularly, to an optical disk which can ensure high-density recording and a method of pre-formatting this optical disk.

2. Description of the Related Art

As a vast amount of information is handled these days, people pay greater attention to optical disks as recording media for saving such information. Because each optical disk has record marks of nearly the same size formed on the recording film by a laser beam which is focused to a spot of about 1 μm in diameter, very high density recording is possible. Optical disks are classified to a read only type typified by a compact disk or a laser disk, a write once type on which information can be written only once as popular in an electronic filing system or the like, and a rewritable type on which information can be rewritten as one used in a hard disk drive or a floppy disk drive. There are two recording systems for the rewritable optical disk: the magneto-optic recording system which applies a magnetic field to the vertical magnetic film and irradiates a laser beam thereon to record or erase information and the phase change recording system which irradiates a laser beam on the recording film to selectively change the state of the recording film between amorphous and crystalline, thereby recording or erasing information.

Due to the recent improvement on the recording density of those optical disks, the amount of embossed pit information previously written or pre-formatted on the optical disks is increasing more and more. FIGS. 1A and 1B show one example of a train of pits. As shown in FIGS. 1A and 1B, a preamble portion formed by the pre-formatting has a densest pattern where pits P1 of the unit pit length are arranged at intervals equal to the pit length and a thinnest pattern, following the densest pattern, where pits P2 whose length is an integer multiple of the unit pit length are arranged at intervals equal to the unit pit length. With such a pit pattern, when the pit intervals of the densest pattern are wide enough for the light beam spot, the light beam spot $B_S$ is not generally irradiated on two pits P1 and P2 at the same time as shown in FIG. 1B. Therefore, the amplitude of a reproduced signal from the densest pattern and the amplitude of a reproduced signal from the thinnest pattern do not change much as shown in FIG. 1C, and the slice level Th for digitization can be approximately constant as indicated by the broken line in FIG. 1C.

As opposed to this pattern, when the pit length of the pits P1 in the densest pattern is made narrower than the size of the beam spot and the intervals of the pits P1 are narrowed to be equal to the shortened pit length as shown in FIGS. 1D and 1E, the light beam spot a1 is simultaneously irradiated on two adjoining pits as indicated by the solid line in FIG. 1E. As shown in FIG. 1F, therefore, the top level of the reproduced signal from the densest pattern becomes lower and the bottom level becomes higher. Consequently, the amplitude of the reproduced signal from the densest pattern becomes smaller than that of the reproduced signal from the thinnest pattern.

When the pit intervals of the densest pattern are wide enough for the light beam spot as shown in FIG. 1C, the amplitudes of the reproduced signal obtained by continuous reproduction from the densest pattern to the thinnest pattern become approximately the same. In setting the slice level for digitizing the reproduced signal, therefore, the slice level Th does not change much at the transitional point from the densest pattern to the thinnest pattern and is almost constant as already mentioned. When, as opposed to the case of FIG. 1C, the pit length and the pit intervals of the pits in the densest pattern are set much smaller than the size of the beam spot, the amplitude of the reproduced signal from the densest pattern differs significantly from the amplitude of the reproduced signal from the subsequent thinnest pattern. Therefore, the slice levels Th1 and Th2 always set approximately at the centers of the amplitudes vary considerably, the signal reproduction cannot follow up the change in slice level at the transitional point of the pit pattern so that a train of pits in the thinnest pattern cannot be reproduced accurately and stably.

SUMMARY OF THE INVENTION

Accordingly, an object of this invention is to provide an optical disk system which has a disk with a pattern of densely packed marks or pits for increased data storage capacity and which has an optical readback signal that can be accurately digitized.

Another object of this invention is to provide an optical disk system which has a disk with a pattern of densely packed marks or pits for increased data storage capacity and which has an optical readback signal that can be stably digitized.

A further object of this invention is to provide an optical disk system which has a disk with a pattern of densely packed marks or pits for increased data storage capacity and which has an optical readback signal that can be digitized with a simple, substantially single digitization slice level.

The above and related objects of this invention are realized by providing an optical disk system with an optical disk that has densely packed marks, or pits, and a focused light beam that has a predetermined light beam spot size on the optical disk. The marks on the optical disk surface, which are pits in one preferred embodiment of this invention, are packed closely enough together such that the spaces between marks are smaller than the predetermined beam spot size. In a preferred embodiment of the invention, there are marks of differing sizes. The beam spot size and the smallest disk mark size are determined such that the beam spot approximately circumscribes the smallest disk mark. This results in the optical signal for the beam spot centered on the smallest disk mark being nearly equal to the optical signal for the beam spot centered on a large disk mark. In addition, the optical signal produced when the beam spot is centered on the "blank" space between any two marks is approximately equal to the optical signal of the beam spot centered on the blank space between any other two marks in a preferred embodiment of the invention.

The optical signal generated as the optical disk rotates, and thus as the beam spot passes over a train of disk marks and blanks, has approximately constant maximum and minimum intensities at the detector. This allows the digitization slice to be set at approximately a single constant value. In addition, there is no abrupt change from one digitization slice level to the next, thus eliminating a source of instabilities in digitizing the signal.

In a preferred embodiment of the invention, the optical disk has at least two groups of marks. The first group of marks have unit marks which all have mark lengths substantially equal to a standard unit mark length and the separation distances between adjacent unit marks are all substantially equal to a first blank length. The second group has a plurality of data marks, each of which has a length which is substantially an integer multiple of the unit mark length, and the separation distances between adjacent data marks are all substantially equal to a second blank length.

As the optical disk rotates, the beam spot first scans across the first group of marks and then across the second group of marks. Since the beam spot is larger than the first and second blank lengths, and substantially circumscribes the unit marks, the digitization slice level used to digitize the reflected optical signal from the first group can also be used to digitize the optical signal from the second group.

This embodiment of the invention has the further characteristic that the duty ratio (defined as the length of the mark divided by the combined length of the blank plus mark) of the first group is an important factor in being able to accurately read the data from the optical disk. In an example in which the marks on the optical disk are pits, the duty ratio should be approximately 70% or more. Another example in which the marks are formed on a phase-change optical disk, the duty ratio should be 60% or more.

In another embodiment of the invention, the data marks are reduced in length by decreasing a reference length by a given factor. Yet another embodiment of the invention varies the width of the marks by varying the intensity of the recording laser as a function of time. Since the optical disk rotates as the mark is being recorded, this results in the width of the mark varying as a function of distance along the mark.

Additional objects and advantages of the invention will be set forth in the description that follows, and in part will be obvious from the description, or may be learned by practice of the invention.

BRIEF DESCRIPTION OF THE DRAWINGS

FIG. 2 is a plane new showing a sector structure;

FIG. 3A is a cross-sectional view schematically showing a train of pits arranged at a high density on an optical disk according to a first embodiment of this invention;

FIG. 3B is a plan view showing the relationship between the size of a focused spot and a train of pits in the high-density arrangement;

FIG. 3C is a waveform diagram of a reproduced signal reproduced from the train of pits shown in FIGS. 3A and 3B;

FIG. 4A is a diagram schematically illustrating a first step of manufacturing a master disk for producing the optical disk shown in FIGS. 3A through 3C;

FIG. 4B is a diagram schematically illustrating a second step of manufacturing the master disk;

FIG. 4C is a diagram schematically illustrating a third step of manufacturing the master disk;

FIG. 4D is a diagram schematically illustrating a fourth step of manufacturing the master disk;

FIG. 5A is a plan view showing a train of pits on an optical disk of a sample A to be produced from the master disk manufactured through the steps illustrated in FIGS. 4A through 4D;

FIG. 5B is a plan view showing a train of pits on an optical disk of a sample B to be produced likewise;

FIG. 5C is a plan view showing a train of pits on an optical disk of a sample C to be produced likewise;

FIG. 5D is a plan view showing a train of pits on an optical disk of a sample D to be produced likewise;

FIG. 9 is a partly cross-sectional view of a writable and erasable optical disk for which this invention can be adapted;

FIG. 10A is a plan view showing a train of pits on an optical disk of a sample A to be produced from the master disk manufactured through the steps illustrated in FIGS. 4A through 4D;

FIG. 10B is a plan view showing a train of pits on an optical disk of a sample B to be produced likewise;

FIG. 10C is a plan view showing a train of pits on an optical disk of a sample C to be produced likewise;

FIG. 10D is a plan view showing a train of pits on an optical disk of a sample D to be produced likewise;

FIG. 11 is a diagram showing the relationship between pits formed on an optical disk according to a second embodiment of this invention and the exposing power of the laser beam irradiated to form the pits;

FIG. 12 is a diagram showing the relationship between the rate R of a change in exposing power and a reproduction error;

FIG. 13A is a diagram showing trains of pits arranged in a VFO region and an ID region on the optical disk;

FIG. 13B is a diagram showing the waveform of the reproduced signal reproduced from a train of pits formed with R=−0.3;

FIG. 13C is a diagram showing the waveform of the reproduced signal reproduced from a train of pits formed with R=−2.0;

FIG. 13D is a diagram showing the waveform of the reproduced signal reproduced from a train of pits formed with R=−10;

FIG. 14A is a diagram showing a train of pits arranged on an optical disk according to a modification of the second embodiment;

FIG. 14B is a diagram showing the waveform of a reproduced signal reproduced from a train of pits before the modification in FIG. 14A is adapted;

FIG. 14C is a diagram showing the waveform of a reproduced signal reproduced from a train of pits after the modification in FIG. 14A is adapted;

FIG. 15A is a diagram showing a reproduced analog waveform reproduced from a train of pits before the modification in FIG. 14A is adapted; and FIG. 15B is a diagram showing a reproduced analog waveform reproduced from a train of pits after the modification in FIG. 14A is adapted.

DETAILED DESCRIPTION OF THE PREFERRED EMBODIMENTS

Figure 1:
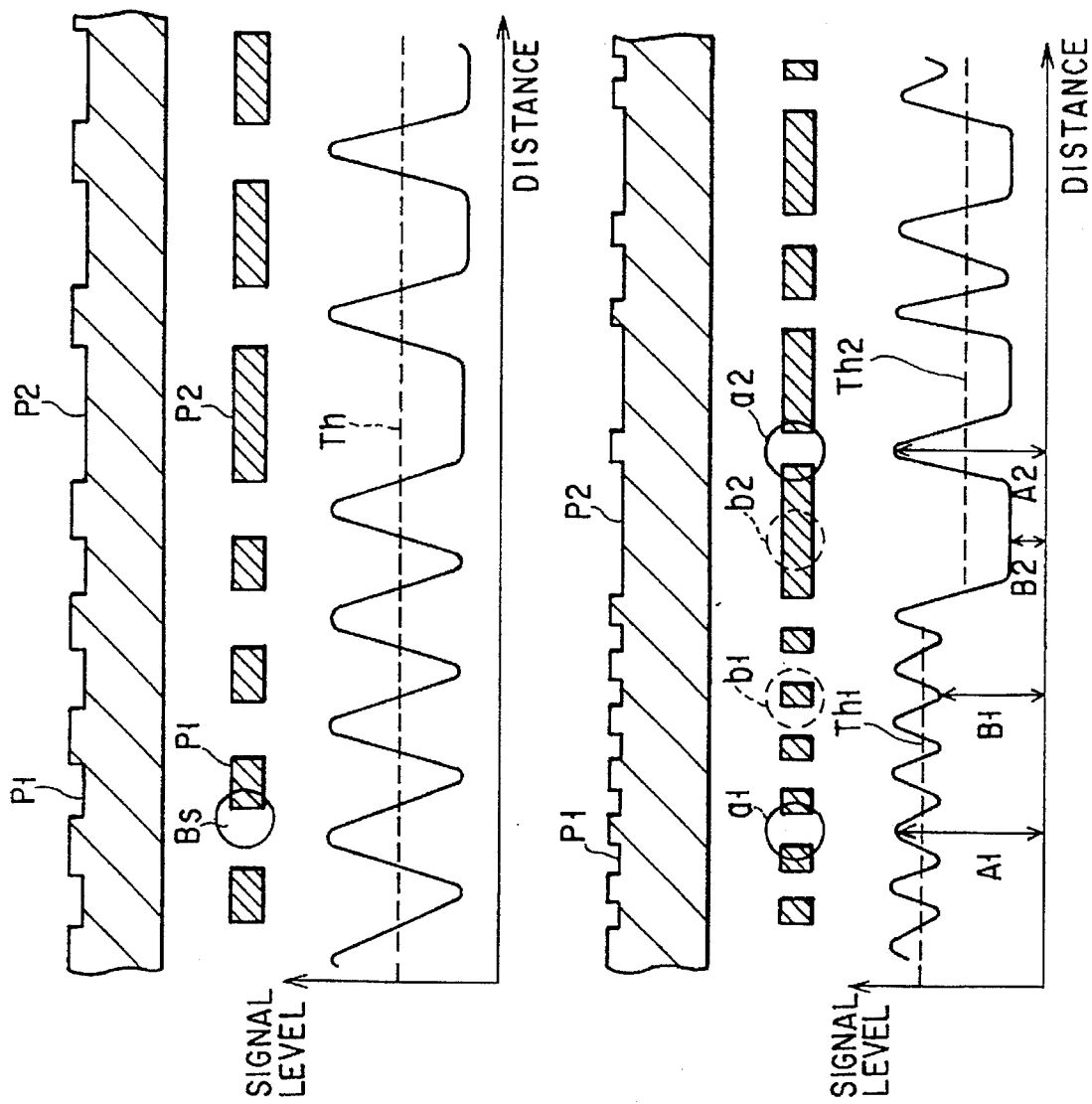
FIG. 1A is a cross-sectional view schematically showing a train of pits on a conventional optical disk.
FIG. 1B is a plan view showing the relationship between the size of a focused spot and a train of pits.
FIG. 1C is a waveform diagram of a reproduced signal reproduced from the train of pits shown in FIGS. 1A and 1B.
FIG. 1D is a cross-sectional view schematically showing a train of pits arranged at a high density on a conventional optical disk.
FIG. 1E is a plan view showing the relationship between the size of a focused spot and a train of pits.
FIG. 1F is a waveform diagram of a reproduced signal reproduced from the train of pits shown in FIGS. 1D and 1E.

Optical disks and methods of manufacturing those optical disks according to preferred embodiments of the present invention will now be described with reference to the accompanying drawings.

On an optical disk formatted in, for example, the modified constant angular velocity (MCAV) system, in general, tracks arranged almost concentrically are divided in the radial direction to a plurality of band regions each consisting of a plurality of tracks, i.e., a plurality of zones, and are divided in the circumferential direction to a plurality of sectors as units for recording data. Each zone contains the same number of sectors each having a sector structure shown in FIG. 2. Data clocks having different specific frequencies are assigned to the individual zones to each reproduce data from or record data on the tracks belonging to the associated zone. Each data clock is pre-recorded in the header portion of each of the associated tracks. Each sector in each zone on the optical disk has a header portion serving as a preformat area where format information is pre-recorded, and a data field as a data area for a user to record information later. The header portion has a sector mark region SM to which sector marks are recorded, which indicate the beginning of one sector, a VFO1 region where a sync code to introduce data clocks is recorded, a AM region which indicate the beginning of ID region and the identification (ID) region where ID or address information relating to a track number and a sector number is recorded, the ID region being reproduced with reference to the data clock; those sector mark, VFO1, AM and ID regions are arranged cyclically. In the data field, a VFO2 region, a sync region and data region are provided. Clock data for reproducing data from the data region are recorded in the VFO2 region in a same manner as in the VFO1 region. Synchronous marks for indicating the beginning of the data region are recorded in the sync region. Data can be recorded in the data region by the user. Provided at the end of the data field is a gap region where no data is written to indicate the boundary between the data field and the next sector. Pit marks corresponding to (2-7) modulated data, i.e., modulated data having two to seven 0's inserted between "1" and "1" are formed in the VFO1 region, the ID region and the data field and are reproduced later. A track number, a sector number and a cyclic redundancy check (CRC) code are recorded as ID information in each ID region. Recorded in each VFO1 region is a sync code which is formed in such a way that 1's are read at given cycles as in "100100100 . . . ." Those signals are supplied as reproduced signals to a data processor, which reads ID information or address information (track number, sector number, etc.) as pre-formatted data, and reproduced data with the data clock specific to each zone.

For the ordinary optical disks, the pit length and the blank length are set equal in a region of the densest pattern like the VFO region, where pits or recessed portions having the unit pit length equivalent to "1" and blanks or projection parts (hereinafter called "lands") equivalent to "0" are arranged alternately and densely. That is, the duty ratio, which is the length of one pit or one blank to the sum of the pit length of one pit and the blank length of one adjoining blank, is 50% for the VFO region on the ordinary optical disk. On the optical disk embodying this invention, the recessed portions where pits are formed are so set as to be longer than the blank between pits; for example, the duty ratio of the pits is set to 70%. For a region of a thin pattern like the ID region where a train of relatively long pits whose lengths are integer multiples of the unit pit length is formed, the recessed portions where pits are formed are also set longer than the normal length and the length of the lands is set equal to that in the densest pattern.

A description will now be given of the advantage of increasing the duty ratio of the pits and shortening the lands to suppress a change in slice level for the digitization of even high-density recorded data.

First, let's take a look at light beam spots a1 and a2 whose centers are nearly located between pits as shown in FIG. 1E which shows the pit arrangement on the conventional optical disk. When the pre-pits in the densest pattern are formed with the duty ratio of 50% as in the prior art, the ratio of the bright portion to the dark portion in the light beam spot a1 is quite the same as that ratio in the light beam spot a2 for lands in the densest pattern and those in the subsequent thinnest pattern. With regard to light beam spots b1 and b2 whose centers are nearly located on pits in the densest pattern and thinnest pattern respectively, there is a larger bright portion in the spot b1 irradiated on the densest pattern than that in the spot b2 irradiated on the thinnest pattern. When those trains of pits are reproduced by an optical disk apparatus to be discussed later, the intensities of the reflected beams returning from the lands in the densest pattern and thinnest pattern are approximately the same and the reproduced signal levels A1 and A2 are approximately the same. The intensity of the reflected beam returning from the recessed portion in the thinnest pattern is lower than that of the reflected beam returning from the recessed portion in the densest pattern, so that the reproduced signal levels B2 is lower than the reproduced signal levels B1. Accordingly, the reproduced signal as shown in FIG. 1F is obtained.

The optical disk according to the first embodiment of this invention will now be depicted with reference to FIGS. 3A through 3C. FIGS. 3A and 3B show one example of the pattern of pre-pits pre-formatted by the optical-disk manufacturing method of this invention, and FIG. 3C exemplifies the signal reproduced from the train of pits.

As shown in FIG. 3B, while the ratio of the bright portion to the dark portion in a light beam spot c1 irradiated on a land in the densest pattern is the same as that ratio in a light beam spot c2 on a land in the thinnest pattern, the bright portions or the lands are narrower than those in the spots a1 and a2 shown in FIG. 1E. As shown in FIG. 3C, therefore, the intensity of the reflected beam returning from the bright portion becomes lower than the intensity in the case of FIG. 1F. With regard to light beam spots d1 and d2 irradiated on the recessed portions in the densest pattern and thinnest pattern as shown in FIG. 3B, it is apparent that the dark portion in the thinnest pattern is larger than that in the densest pattern. When one compares the light beam spot b1 in FIG. 1E with the light beam spot d1 in FIG. 3B, it should be apparent that the dark portion in the light beam spot d1 is larger than that in the light beam spot b1.

The above can be expressed as follows in terms of the absolute values of the signal levels of the reproduced signals (indicated by signal levels A1, A2, B1, B2, C1, C2, D1 and D2 in FIGS. 1F and 3C).

A1=A2>C1=C2, B1>B2, D1>D2 and B1>D1, B2=D2.

In terms of the amplitudes of the reproduced signals,

A1–B1<C1–D1, A2–B2>C2–D2.

It is apparent from the comparison of FIG. 1F with FIG. 3C, the amplitude of the reproduced signal from the densest pattern on the optical disk of this invention becomes greater than that on the ordinary optical disks while the amplitude of the reproduced signal from the thinnest pattern becomes smaller. As a consequence, the relative change in the amplitude of the reproduced signal from the densest pattern to the change in the amplitude of the reproduced signal from the thinnest pattern becomes smaller, thereby suppressing changes in slice levels Th3, Th4 and Th5 for the digitization of the reproduced signal.

The method of manufacturing an optical disk according to this invention will now be described.

The steps of manufacturing the master disk for producing the optical disk of this invention will be depicted with reference to FIGS. 4A through 4D.

As shown in FIG. 4A, in the first step, a glass substrate 5 is cleaned and is then dried. Next, a photoresist 6 is coated on this glass substrate 5 in the second step, as shown in FIG. 4B. An optical-disk master disk 1 is the glass substrate 5 coated with the photoresist 6. In the third step, a laser beam 7 modulated in accordance with format information is focused by an objective lens 8 to expose the photoresist 6, as shown in FIG. 4C. Consequently, an exposed portion 9 is formed in the photoresist 6. In the fourth step, the master disk 1 shown in FIG. 4C is developed to remove the exposed portion 9, thus forming a pit 10 as shown in FIG. 4D.

Normally, the cross-sectional shape of the pit 10 is rectangular or trapezoidal. The film thickness d of the conventional optical-disk master disk is set to $\lambda/4n$ ($\lambda$: the reproducing laser wavelength and n: refractive index of the glass substrate) at which the level of the reproduced signal becomes maximum and the film thickness d and the pit depth d are set equal to each other.

Figure 7:
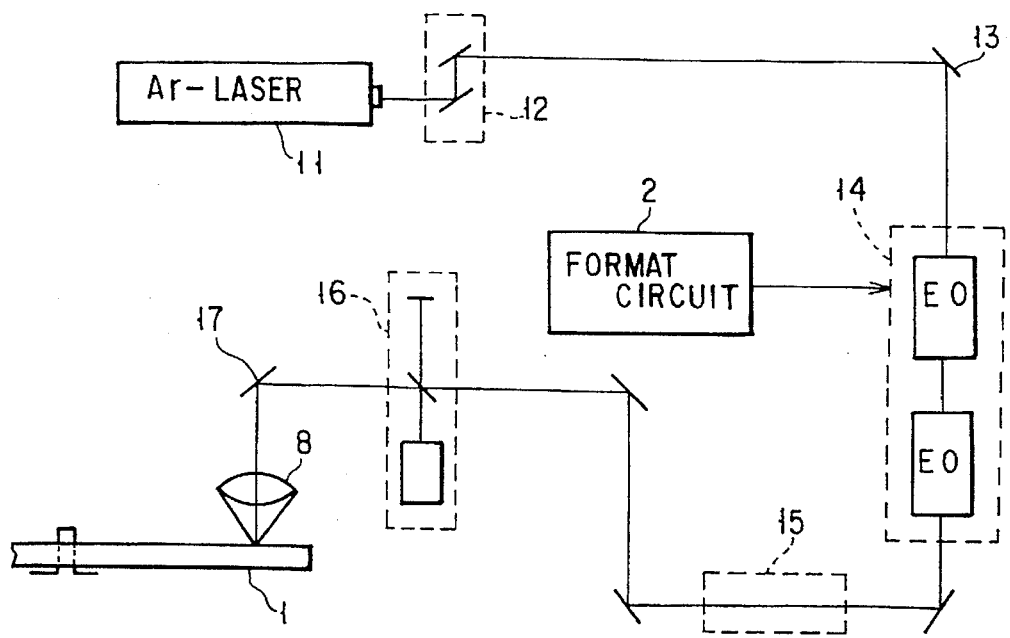
FIG. 7 is a block diagram showing a mechanism for pre-formatting optical disks of the samples A to D shown in FIGS. 5A through 5D.

In the third step, for example, the optical system as shown in FIG. 7 is used. FIG. 7 shows a master producing apparatus for forming grooves and a pre-format pattern on the optical disk of this invention. In the pre-formatting, the VFO regions in which shortest marks are repeated for the synchronization purpose, ID regions where address data such as the track numbers and sector numbers are written, and address mark regions each indicating the beginning of the associated ID region are formed. In FIG. 7, a laser beam (e.g., Ar laser beam or Kr laser beam) is emitted from a laser source 11. This laser beam enters a laser optical-axis control system 12 which can adjust the optical axis of the laser source 11 even if shifted due to a temperature change or the like. The laser beam is reflected by a mirror 13 to enter a beam modulation system 14 to which a format signal is supplied and which comprises electro-optical (E.O) modulators. The reflected laser beam is modulated there to become a laser beam having an arbitrary signal. In other words, the laser beam is modulated in the beam modulation system 14 with the format signal supplied from a format circuit 2. Next, the laser beam passes a beam shaping system 15 which comprises a pin hole or a slit, so that the beam size and the beam shape are adjusted. The beam shape of the laser beam after the shape adjustment or the like is checked by a beam monitor system 16. The beam is further guided to a mirror 17 and is then focused and irradiated on the optical-disk master disk 1 by an objective lens 8, thereby recording grooves and a format pattern on the optical disk coated with the photoresist.

The exposed and developed master disk 1 is plated with nickel to become a stamper. A photo-curing resin, such as ultraviolet-curing resin, is coated on a transparent substrate like a glass or plastic substrate, and the resultant structure is pressed with the stamper and is irradiated with ultraviolet rays to harden the resin. The substrate of an optical disk is prepared in this manner. A recording layer which causes phase change or becomes a diffusion alloy by the laser irradiation is provided on this substrate as needed.

The following first experiment was conducted using the master producing apparatus shown in FIG. 7. To simulate high-density recording, it was assumed that the minimum spot corresponding to the densest pattern lies completely in the spot of the reproducing laser beam. First, the photoresist 6 was exposed to laser beam so that the duty ratio of the pits in the densest pattern became 50%. At this time, the laser beam 7 for exposing the photoresist 6 was generated by supplying a drive pulse having a pulse width corresponding to the length of the pit to be formed to a laser driver. The laser beam 7 was turned on and off at given periods so that the duty ratio of the pits to be formed became 50%. The photoresist 6 was exposed by the thus generated laser beam 7. The pit length of the pits actually formed on the substrate 5 is specifically determined by the rotational speed of the substrate 5 coated with the photoresist and the ON/OFF times of the laser beam. In this example, the wavelength of the reproducing laser beam is 685 nm, and the numerical aperture (NA) of the objective lens is 0.6, so that the diameter of the laser spot focused on the substrate is about 1 µm. In this example, therefore, the master disk was prepared in such a manner that the pit length of the pits in the densest pattern became 0.5 µm and the length of the lands where there were no pits or the length of the blanks also became 0.5 µm. The length of the pit-less blanks was also set to 0.5 µm even for the thin pit pattern other than the densest pattern. This master disk was called a sample A.

To check the advantage of this invention to suppress a change in the amplitude of the reproduced signal from an optical disk by altering the duty ratio of pits in the densest pattern, optical-disk master disks which provided the duty ratios of the pits and the blanks in the densest pattern of 60% and 40%, 70% and 30%, and 80% and 20% were prepared. That is, the pulse width of the drive pulse was changed in accordance with such duty ratios. The laser beam generated by the drive pulse was irradiated on the photoresist to form the actual pits (recessed portions) and blanks (lands) corresponding to the densest pattern. In this manner, the master disks having the pit length and the blank length of 0.6 µm and 0.4 µm, 0.7 µm and 0.3 µm, and 0.8 µm and 0.2 µm were prepared and were called samples B, C and D, respectively. It is needless to say that for the samples B, C and D, the lengths of the blanks (lands) in the thinnest pattern following the densest pattern are respectively 0.4 µm, 0.3 µm and 0.2 µm.

Those samples A, B, C and D are illustrated in FIGS. 5A, 5B, 5C and 5D, respectively.

The thus prepared master disks of the samples A, B, C and D of 3.5 inches in diameter were plated to prepare stampers. Using those stampers A, B, C and D, plastic optical-disk substrates A, B, C and D were formed. Those substrates A to D are made of polycarbonate and are 3.5 inches in diameter and 1.2 mm in thickness. Further, each of those substrates was placed in a vacuum evaporator to form an aluminum reflection film. The final disk samples for reproduction were also called samples A, B, C and D in association with the original master disks.

Figure 6:
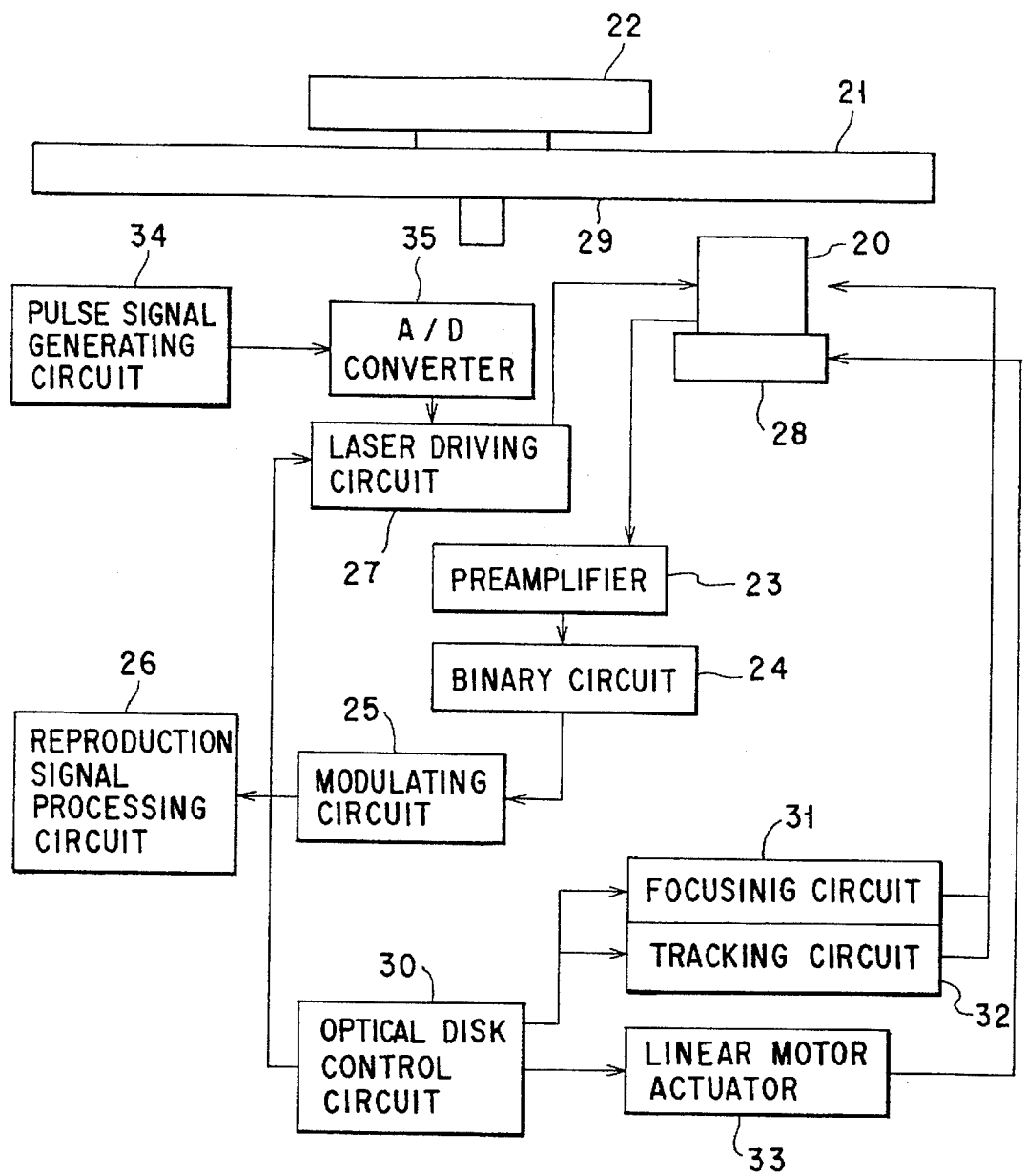
FIG. 6 is a block diagram schematically showing an optical disk apparatus for playing optical disks of the samples A to D shown in FIGS. 5A through 5D.

Those 3.5-in sample disks A, B, C and D were loaded in an optical disk drive apparatus shown in FIG. 6 to test the digitization of reproduced signals. A disk 21 shown in FIG. 6 was rotated to a predetermined number of rotations by a spindle motor 22. The disk 21 has pit-like grooves formed by the previous production of the master disk. An optical head 20 is controlled by a focusing circuit 31 and a tracking circuit 32 such a way as to move in responsive to the surface vibration of the grooves and the disk 21. The pre-pits on a disk surface 29 are read by the laser beam controlled by a laser driver 27 and reproduced by the optical head 20. The reproduced analog signal is amplified by a preamplifier 23, and converted to a binary signal of 1 and 0 by a binary circuit 24. The binary signal is sent through a modulating circuit 25 to a reproduction signal processing circuit 26 to be reproduced as original information recorded on the master disk.

The binary circuit 24 detects the peak of a waveform higher than a given slice level to digitize the analog signal, and outputs a logic value 1 as the detection output. When detecting the peak of a waveform lower than that slice level, the binary circuit 24 outputs a logic value 0. This slice level is generally set to the center of the amplitude of the waveform.

Data prepared for a computer is recorded as information on those sample disks A, B, C and D. Data equivalent to the header portion and the data portion are recorded on each sample disk. The header portion has the densest pattern where pits having the unit pit length are recorded at the highest density as in the VFO region, and the thinnest pattern where pits whose lengths are integer multiples of the unit pit length are recorded as in the ID region. The signal reproduced from the pits recorded in the densest pattern is equivalent to a sync signal which is supplied to a phase locked loop (PLL) circuit for later digitization of data. The data portion is recorded following this header portion.

In this experiment, it was tested to determine whether the thinnest pattern following the densest pattern could be read by the binary circuit of the drive apparatus. For the sample disks A and B, the slice level located nearly at the center of the waveform of the reproduced signal varied greatly in the thinnest pattern following the densest pattern, disabling the reproduction of the thinnest pattern. As regards the sample disks C and D, however, the thinnest pattern could be reproduced as usual.

Figure 8A:
FIG. 8A is a diagram showing a reproduced analog waveform of the densest pattern on the optical disk of the sample C shown in FIG. 5C.
Figure 8B:
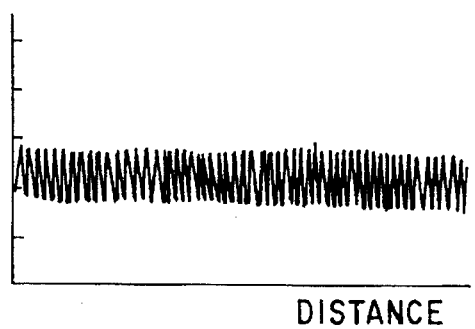
FIG. 8B is a diagram showing a reproduced analog waveform of the thinnest pattern on the optical disk of the sample C.
Figure 8C:
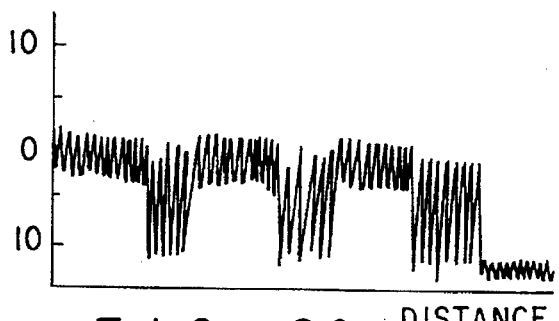
FIG. 8C is a diagram showing a reproduced analog waveform of the densest pattern on the optical disk of the sample A shown in FIG. 5A.
Figure 8D:
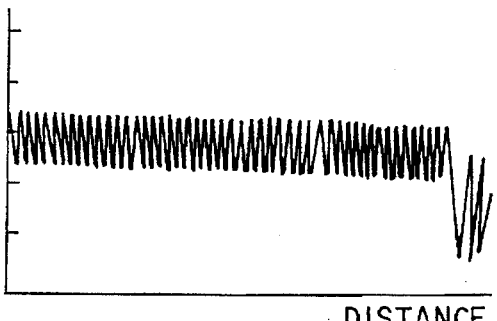
FIG. 8D is a diagram showing a reproduced analog waveform of the thinnest pattern on the optical disk of the sample A.

FIGS. 8A and 8B show the reproduced analog waveforms of the densest pattern and the thinnest pattern on the sample disk C. FIGS. 8C and 8D show the reproduced analog waveforms of the densest pattern and the thinnest pattern on the sample disk A. It is apparent that the amplitude of the reproduced signal from the densest pattern and the amplitude of the reproduced signal from the thinnest pattern vary significantly in FIGS. 8C and 8D, whereas the amplitudes of the reproduced signals become much gentler in FIGS. 8A and 8B.

It was found that in reproducing a train of pits on the optical disk, therefore, changes in the amplitudes of the densest pit pattern and other pit patterns, particularly, the thinnest pattern could be suppressed to stabilize the slice level at the time of digitizing the reproduced signal, thus ensuring the stable digitization.

Although the descriptions of the prior art and this embodiment have been given with reference to the case where the pre-pit portions are recessed portions and the blank portions are lands, quite the same advantage can of course be expected when the pre-pit portions are lands and the blank portions are recessed portion. Although the description of this invention has been given with reference to the case where the pre-pits are previously formed on the substrate, it is needless to say that quite the same advantage can be expected if the recording film is formed on the substrate and the laser beam is focused on the recording film by the drive apparatus to effect the write once type recording or the rewritable type recording.

A second experiment in which this invention was adapted for an optical disk recordable and erasable in the phase change manner was conducted next.

A phase change type optical disk has a dielectric film 51 of ZnS·SiO$_2$ formed 270 nm thick on a polycarbonate substrate 50, which is 3.5 inches in diameter and 1.2 mm in thickness, a phase change type recording film 52 of a three-element alloy of GeSbTe formed 20 nm thick, a ZnS·SiO$_2$ dielectric film 53 formed 20 nm thick, and a reflection film 54 of an Al alloy formed 200 nm thick, those films stacked in the named order. Data corresponding to the densest pattern and thinnest pattern were recorded on this phase change type optical disk by using the optical disk drive apparatus shown in FIG. 6.

A pulse signal generating circuit 34 generates the drive pulse corresponding to the densest pattern consisting of pits having the unit pit length and the thinnest pattern consisting of pits having arbitrary pit lengths. This drive pulse is supplied via an A/D converter 35 to the laser driving circuit 27. The laser beam corresponding to the pulse is generated by the laser driving circuit 27, and this laser beam is emitted toward the optical disk surface 29 from the optical head 20 under the control of the focusing circuit 31 and the tracking circuit 32. The laser beam power on the optical disk surface 29 at the time of recording is 13 mW, for example. In the above manner, marks corresponding to the densest pattern and thinnest pattern were recorded on the phase change type optical disk 21. In this case, as the laser wavelength is 685 nm and NA of the objective lens is 0.6, the diameter of the focused laser beam is about 1 μm. The reflectance of the unrecorded portion on the phase change type optical disk is about 20%, while the reflectance of the portion of the marks recorded by the irradiation of the laser beam is dropped to 10%.

This phase change type optical disk was subjected to the same experiment as done in the case of the pre-pits illustrated in FIGS. 5A through 5D. More specifically, the densest pattern was recorded in such a way that the lengths of the recorded marks with the reflectance of 10% became 0.5 μm, 0.6 μm, 0.7 μm and 0.8 μm while the lengths of the unrecorded portions with the reflectance of 20% became 0.5 μm, 0.4 μm, 0.3 μm and 0.2 μm. After each densest pattern, record marks corresponding to data were recorded in arbitrary lengths by the mark length recording system in such a manner that the unrecorded portions between the record marks became 0.5 μm, 0.4 μm, 0.3 μm and 0.2 μm, respectively. Those four pieces of recorded data were referred to as data A, B, C and D as in the case illustrated in FIGS. 5A to 5D.

Then, those four pieces of recorded data were reproduced by the optical disk apparatus shown in FIG. 6. The laser beam power at the reproduction time was 0.7 mW, for example, and the laser beam in use was a continuous wave. To digitize the waveform of the reproduced signal, the center of the reproduced waveform was sliced at the center as in the first experiment. In the second experiment, as different from the first experiment, the mark length recording system is employed, so that the portion at which the reproduced waveform crosses the slice level is detected as the mark edge which is treated as the logic value 1 while the other portion is treated as the logic value 0. The results of the second experiments showed that in attempting the digitization of the densest pattern and then the digitization of the thin pattern following the densest pattern as in the first experiment, the data A could not be discriminated while the data B, C and D could be reproduced as the recorded information.

Next, the following third experiment was conducted.

Like the sample disks shown in FIGS. 5A to 5D, sample disks A, B, C and D shown in FIGS. 10A to 10D with the changed duty ratios of pits in the densest pattern were prepared and the same experiment as the above-described first experiment was conducted. The difference from the sample disks shown in FIGS. 5A to 5D however lies in that the sample disks A, B, C and D shown in FIGS. 10A to 10D in that the lengths of the blanks (lands) between pits in the thin pattern other than the densest pattern are all set to 0.5 μm.

First, the master disk was prepared in such a manner that the pit length of the pits in the densest pattern became 0.5 μm and the blank length also became 0.5 μm. The length of the pit-less blanks was also set to 0.5 μm even for the thin pit pattern other than the densest pattern. This master disk was called a sample A.

Next, optical-disk master disks which provided the duty ratios of the pits and the blanks in the densest pattern of 60% and 40%, 70% and 30%, and 80% and 20% were prepared. That is, the master disks having the pit length and the blank length of 0.6 μm and 0.4 μm, 0.7 μm and 0.3 μm, and 0.8 μm and 0.2 μm were prepared and were called samples B, C and D, respectively. It is needless to say that for the samples B, C and D, the lengths of the blanks (lands) in the thin pattern other than the densest pattern were all set to 0.5 μm.

Those samples A, B, C and D are illustrated in FIGS. 10A, 10B, 10C and 10D, respectively.

Using the thus prepared 3.5-in optical-disk master disks of the sample disks A, B, C and D, disk samples for reproduction were produced as in the first experiment and were called sample A, B, C and D in association with the original master disks.

Those 3.5-in sample disks A, B, C and D were loaded in the optical disk drive apparatus shown in FIG. 6 to test the digitization of reproduced signals as in the first experiment. For the sample disks A and B, the slice level varied greatly in the thinnest pattern following the densest pattern, disabling the reproduction of the thinnest pattern, as per the first experiment. As regards the sample disks C and D, however, it was confirmed that the thinnest pattern could be reproduced following the reproduction of the densest pattern as usual.

It was proved that in processing the reproduced signal by changing the duty ratio of the pits on the densest pattern to those of the sample disks C and D, changes in the amplitudes of the densest pit pattern and other pit patterns, particularly, the thinnest pattern following the densest pattern could be suppressed to stabilize the slice level at the time of digitizing the reproduced signal, thus ensuring the stable digitization.

As described above, this invention records, erases and reproduces information with respect to a recording medium like an optical disk by the irradiation of a laser beam, and performs recording in such a way that the duty ratio of the blank portions between the shortest record marks corresponding to the densest pattern become smaller than the duty ratio of the shortest record marks for the cases (1) where at least the size of the focused light beam spot (the diameter of the light portion whose center intensity becomes $1/e^2$) is large enough to overlap both edges of two record marks corresponding to the densest pattern and (2) where one shortest record mark corresponding to the densest pattern falls almost completely in the light beam spot, and that the blank portions in the other thin portion have the same length as the length of the blank corresponding to the densest pattern. It is therefore possible to suppress changes in the amplitudes of the densest pit pattern and other pit patterns, particularly, the thinnest pattern at the time of processing the reproduced signal to stabilize the slice level at the time of digitizing the reproduced signal, thus ensuring the stable digitization.

The pre-format recording method in the optical disk manufacturing method of this invention, as discussed above, can provide an optical disk on which the amplitude of the reproduced signal is limited to almost a given range so that the reproduced signal can surely be digitized even when information is recorded at high density.

The second embodiment of this invention will now be described.

In this second embodiment, at the time of forming pits Ps in the densest pattern, the exposing power of the laser beam is relatively increased by the beam modulation system 14 in the master disk manufacturing apparatus shown in FIG. 7, based on the format signal generated from the format circuit 2 as shown in FIG. 11. At the time of forming pits P1 in a relatively thin pattern, particularly, the thinnest pattern, the exposing power of the laser beam is relatively and gradually reduced. That is, when the thin pattern is formed, the laser beam power is gradually attenuated to reduce the length of the pit P1 to be formed from the front edge to the rear edge and the width of the pit P1, as compared with the case where the densest pattern is formed. This pit forming scheme will be discussed later in detail. The E.O modulator in the beam modulation system 14 can execute fast light quantity modulation (on the order of MHz), and the light intensity can easily be altered by quickly changing the bias voltage to be applied to the E.O modulator, thus permitting the size of each pit to be adjusted.

As already depicted with reference to FIGS. 4A to 4D, pre-pits formed on the optical-disk master disk through the exposure and developing processes slightly vary the reproduced signal with respect to the actual substrate in the light of the transfer characteristic at the time of preparing the stamper and preparing the substrate. But, it can be considered that the pit shapes at the time of exposure and development approximately reflect on the completed optical disk. In this respect, the optical-disk master disk obtained by coating the photoresist on a glass plate of 1.2 mm thick was cut by a cutting apparatus, and the reproduced signal recorded on the optical disk by the optical disk apparatus shown in FIG. 6 was evaluated.

As described above, according to the second embodiment, in forming a train of pits of different pit lengths as shown in FIG. 11, the exposing power of the laser beam is attenuated by a given ratio as time passes. That is, in forming pre-pits having the pit Ps and pit P1, the exposing power is reduced by a given ratio in the direction from the front edge of each pit to the rear edge. For the optical disk on which data is recorded and reproduced in the (2–7) modulation system, the pits Ps and P1 have six different lengths from 3T (T: channel clock) to 8T, for example. With regard to the short pits like the pit Ps having the length of 3T, the exposing power hardly changes and the amount of a change in exposing power is very small. Therefore, the pit length and width hardly differ from those of the prior art. With regard to the pit P1 having a length of 7T or 8T, as opposed to the pit Ps, the exposing power attenuates toward the rear edge of the pit, gradually making the pit's shape sharper. In general, while the width of the pit P1 longer than the short pit Ps tends to become wider, the width of the long pit P1 may be considered as being properly compensated by the amount of attenuation of the exposing power in some case.

An experiment was conducted to check if the pre-pit pattern, when formed by reducing the exposing power by a given rate in this manner, was reproduced by the optical disk apparatus shown in FIG. 6. More specifically, it was checked if the thinnest pattern corresponding to the ID region can be digitized using the slice level determined by the amplitude of the reproduced signal from the densest pattern corresponding to the VFO region. At this time, the pit pattern recorded at the inner track position of about 24 mm in the radial direction of the disk was reproduced, and the rate R of change in exposing power was defined as the amount of change in the exposing power with respect to the time of the channel clock T. The results of this experiment were shown in FIG. 12. As indicated by "O" in FIG. 12, when the rate R of the change in exposing power is −1.5 to −3.0 (mW/μsec), it was confirmed that the ID region could accurately be digitized following the digitization of the VFO region and the reproduced signal contained no error signal. The mark "X" in FIG. 12 indicates that the amplitude of the signal in the VFO region was not sufficient so that the signal was not reproduced stably. From the results, it is assumed that because sufficient exposing power was not given to form the shortest pits, the amplitude of the signal in the VFO region was insufficient, making the slice level unstable. The mark "Δ" in FIG. 12 indicates that the slice level for the VFO region is too high to accurately digitize the ID region so that an error signal is included in the reproduced signal.

FIG. 13A shows pre-pit patterns of the VFO region and ID region formed by attenuating the exposing power by a given rate. FIG. 13B, 13C and 13D respectively show models of the reproduced signal when there are three types of rates R of change in exposing power, namely −0.3, −2.0 and −10 (mW/μsec). The mirror level is equivalent to the level of the reproduced signal corresponding to the amount of light reflected from the optical disk after the irradiation of the light beam spot on the optical disk where no pits are formed yet, and the groove level is equivalent to the level of the reproduced signal corresponding to the amount of light reflected from the groove formed on the optical disk after the irradiation of the entire light beam spot in the groove.

It is apparent from FIG. 13B that the slice level determined by the VFO region cannot ensure the accurate digitization of the reproduced signal from the ID region. It is apparent from FIG. 13D that the amplitude of the signal in the VFO region is insufficient and the slice level determined by the VFO region is not stable, thus disabling the accurate digitization of the signal in the ID region. It is understood from this experiment that the changing rate R which provides the reproduced signal as shown in FIG. 13C is the best from the viewpoints of determining the slice level and digitizing the signal. It is apparent that exposing power should be determined in view of the signal amplitude and the degree of modulation as well as the level of each signal.

For the optical disk of the MCAV system, similar consideration should be taken for the outer track portion whose clock frequency or channel frequency is high. At the time of recording, the channel frequency at the outer track portion of the optical disk is higher than that of the inner track portion, so that the pulse width of the laser beam to expose the optical disk becomes smaller, requiring that the exposing power be changed more rapidly. The same experiment as done for the inner track portion was also conducted for the outer track position of about 40 nm in the radial direction of the disk. It was confirmed through the experiment that when the optical disk was exposed by the exposing power that was attenuated by the changing rate R about twice the rate R in the case of FIG. 12, the slice level obtained from the reproduced signal from the VFO region became stable and the slice level allowed the ID region following the VFO region to be accurately digitized.

The attenuation of the exposing power by a given rate in the above manner is apparently effective to prevent a binary error from occurring in the reproduced signal though it is affected by the photosensitivity characteristic of the photoresist, the characteristic of the cutting apparatus and the like. Further, in this embodiment, the exposing power of the laser beam is controlled such that the rate of change in the exposing power for an outer track is higher than that for an inner track on a MCAV type disk or the like.

This control is very effective to accomplish stable digitization.

A modification of the second embodiments will now be described.

As shown in FIG. 13A, there is a difference between the signal level for the VFO region where the densest patterns continue and the signal level for the ID region where pits of various lengths are present, and the signal level of the ID region, in particular, falls considerably. At the time of irradiating the laser beam on the optical disk to form a pit pattern thereon, therefore, the drive pulse for driving the laser source is cut by a given ratio proportional to the lengths of the pits. More specifically, while the drive pulse to generate the laser beam normally has a pulse width according to the pit length of the pit to be formed actually, this modification cuts the pulse width by a given ratio proportional to the pit length. In other words, the longer the pit length becomes, the more the front edge portion and the rear edge portion of that pit are cut. In this manner, the pit pattern as shown in FIG. 14A is formed. The shaded portion in FIG. 14A is equivalent to the cut portion, and the portion surrounded by the broken line is the pit pattern that is actually formed. The portion surrounded by the solid-line is the pattern of an actual pit to be formed. It is apparent from the solid-line portion and the broken-line portion in FIG. 14A that the pit area is reduced to widen the distance between pits.

FIG. 14B shows the reproduced signal when pits are formed in the solid-line portions. FIG. 14C shows the reproduced signal when pits are formed in the broken-line portions. It is obvious from FIGS. 14B and 14C that when the distance of the portion sandwiched between long pits becomes longer, the signal level increases. For the densest pattern, because the cut width is small, the level before cutting does not change greatly after the cutting. Accordingly, the difference between the levels of the signals in the entire pit pattern including the VFO region and ID region becomes smaller. It is therefore possible to surely digitize the reproduced signal.

The cutting of the pulse width of the laser beam in this manner can easily be accomplished by putting the format signal generated from the format circuit 2 into a delay circuit and ANDing this format signal and the inversion signal of the cut pulse generated after the detection of the pulse width.

FIGS. 15A and 15B show the reproduced signal in the case where the pulse width has not been cut at all and the reproduced signal in the case where the pulse width has been cut at the cutting ratio of 25% (k=0.25), respectively. It is apparent from FIGS. 15A and 15B that cutting the pulse width shows a sufficient advantage in adjusting the signal level. As indicated by the model in FIG. 13D, however, if the cut portion is too large, the signal amplitude may not be obtained sufficiently and the slice level may become unstable, so that a proper value k which is determined by the photosensitivity characteristic of the photoresist, the characteristic of the cutting apparatus and the like should be selected. If the proportional constant k determined by the photosensitivity characteristic of the photoresist, the characteristic of the cutting apparatus and the like is acquired previously under some conditions, the proper pit shape can be obtained regardless of a slight change in exposing condition.

In short, although the foregoing description has been given with reference to the case where formatting is executed by the master disk manufacturing apparatus shown in FIG. 7, all the pits or some of them may be formed by the optical disk apparatus shown in FIG. 6. In this case, as apparent from the above description, when the recorded signal from the signal processing system is equivalent to a long pit, signal processing is previously performed so as to reduce the exposing power level at a certain inclination. Alternatively, a part of the pulse width of the recorded signal equivalent to a long pit has only to be cut.

According to the second embodiment, as discussed above, the difference between the amplitude levels of the signals in the VFO region and ID region in the header portion of the recording medium becomes smaller, so that even when the slice level for digitization is set based on the signal amplitude of the VFO region, a binary error is prevented from occurring in the header portion at the time of reproduction, thus ensuring the digitization of the reproduced signal.

What is claimed is:

1. An optical disk having a surface from which data is adapted to be retrieved with reproducing apparatus generating a focused light beam and a light beam spot having a predetermined size formed by said focused light beam, said reproducing apparatus producing a waveform of a signal representing said data recorded on said surface of said optical disk, which is generated in accordance with an intensity of a reflected light beam reflected from said surface, said optical disk comprising:

a first group including a plurality of unit marks having a unit mark length, said unit mark length being determined by shortening a reference unit length by a first predetermined amount, said unit marks being arranged in such a manner that unit marks adjacent to each other are separated by a first blank having a first blank length, said first blank being smaller than the size of said beam spot; and a second group following said first group, said second group including a plurality of data marks having data mark lengths, said data mark lengths being determined by shortening reference lengths by a second predetermined amount, said data marks being integer multiples of said reference unit length, said data marks being separated from one another with a second blank having a second blank length, wherein said first and second predetermined amounts are set such that a first peak and a first bottom of said waveform of said signal generated from said reflection light beam from said first group substantially coincides with a second peak and a second bottom of said signal waveform generated from said reflection light beam from said second group.

2. The optical disk according to claim 1, wherein said first blank length is greater than a reference blank length by a difference between said reference unit length and said unit mark length, and said second blank length is greater than said reference blank length by a difference between said reference lengths and said data mark lengths.

3. The optical disk according to claim 1, wherein said first blank length is smaller than said second blank length.

4. The optical disk according to claim 1, Wherein said marks includes pits.

5. An optical disk having a surface from which data is retrieved with a focused light beam and a light beam spot having a predetermined size formed by said focused light beam, said surface having tracks formed thereon, said tracks having header sections indicating addresses of said data and recording regions on which data to be reproduced immediately after the header is reproduced is recorded, said optical disk comprising:

a first group of marks and blanks alternately arranged in an array at a first mark density in which a first predetermined number of the first group marks being arranged in a unit length, the blank having a blank length smaller than the beam spot size and being set shorter than that of the first group mark; and a second group of marks and blanks alternately arranged in the array at a second mark density larger than the first mark density and continued to the first mark group, in the second mark density, a second number of second group marks smaller than the first number of first group marks being arranged in the unit length, wherein said length of said first group mark is more than 70% of an addition of said length of said first group mark and said blank length.

6. The optical disk according to claim 5, wherein said first blank length is equal to said second blank length.

7. The optical disk according to claim 5, wherein said first blank length is smaller than said second blank length.

8. The optical disk according to claim 5, wherein said marks includes pits.

9. An optical disk having a surface from which data is retrieved with a focused light beam and a light beam spot having a predetermined size formed by said focused light beam, said surface having tracks formed thereon, said tracks having header sections indicating addresses of said data and recording regions on which data to be reproduced immediately after the header is reproduced is recorded, said optical disk comprising:

a first group of marks and blanks alternately arranged in an array at a first mark density in which a first predetermined number of the first group marks being arranged in a unit length, the blank having a blank length smaller than the beam spot size; and a second group of marks and blanks alternately arranged in the array at a second mark density larger than the first mark density and continued to the first mark group, in the second mark density, a second number of second group marks smaller than the first number of first group marks being arranged in the unit length, each of the second marks being elongated depending on the length of the second mark and the second group blanks having blank lengths which are varied in accordance with the length of the adjacent second marks and larger than that of the first group blanks, wherein said length of said first group mark is more than 70% of an addition of said length of said first group mark and said blank length.

10. The optical disk according to claim 9, wherein said first blank length is greater than a reference blank length by a difference between said reference unit length and said actual unit mark length, and said second blank length is greater than said reference blank length by a difference between said reference lengths and said actual data mark lengths.

11. The optical disk according to claim 9, wherein said first blank length is smaller than said second blank length.

12. The optical disk according to claim 9, wherein said marks includes pits.

13. An optical disk having a substrate and a reflecting film formed on the substrate, on which a light beam spot having a predetermined size is formed on the reflecting film by a focused light beam, said substrate comprising:

a first group including a plurality of unit marks each having a unit mark length, said unit marks being arranged such that said unit marks adjacent to each other are separated by a first blank having a first blank length, said first blank and said unit marks being smaller than said beam spot in size, said unit mark length being more than 70% of an addition of said unit mark length and said first blank length; and a second group following said first group, said second group including a plurality of data marks which have data mark lengths, said data mark lengths being substantially integer multiples of said unit mark length, and said data marks adjacent to each other being separated by a second blank having a second blank length.

14. A phase-change type optical disk having a substrate, a dielectric film formed on the substrate, and a recording film formed on the dielectric film, on which a light beam spot having a predetermined size is formed on the dielectric film by a focused light beam, said substrate comprising:

a first group including a plurality of unit marks each having a unit mark length, said unit marks being arranged such that unit marks adjacent to each other are separated by a first blank having a first blank length, said first blank and said unit marks being smaller than said beam spot in size, said unit mark length being more than 60% of an addition of said unit mark length and said first blank length; and a second group following said first group, said second group including a plurality of data marks which have data mark lengths, said data mark lengths being substantially integer multiples of said unit mark length, and said data marks adjacent to each other being separated by a second blank having a second blank length.

15. An optical disk having a surface from which data is adapted to be retrieved with reproducing apparatus generating a focused light beam having a light beam spot, said light beam spot having a predetermined size formed by said focused light beam, said reproducing apparatus producing a waveform of a signal representing said data recorded on said surface of said optical disk which is generated in accordance with an intensity of a reflection light beam reflected from said surface, said optical disk, comprising:

a first group including a plurality of unit marks each having a unit mark length, said unit marks lengths arranged such that unit marks adjacent to each other are separated by a first blank having a first blank length, said first blank and said unit marks being smaller than said beam spot in size, said first blank length being set smaller than said unit mark length; and a second group following said first group, said second group including a plurality of data marks which have data mark lengths, said data mark lengths being substantially integer multiples of said unit mark length, said data marks adjacent to each other being separated by a second blank having a second blank length;

wherein a ratio of said first blank length to an addition of said first blank length and said unit mark length is set such that a first peak and a first bottom of said waveform of said signal generated from said reflection light beam from said first group substantially coincides with a second peak and a second bottom of a waveform of said signal generated from said reflection light beam from said second group.

16. The optical disk according to any one of claims 13, 14 and 15, wherein said first blank length is equal to said second blank length.

17. The optical disk according to any one of claims 13, 14 and 15, wherein said first blank length is smaller than said second blank length.

18. The optical disk according to any one of claims 13, 14 and 15, wherein said marks include pits.

19. An optical disk according to any one of claims 13, 14, and 15, wherein a width of each of said data marks of said second group decreases at a predetermined rate in a direction from an edge of each of said data marks on a side of said first group to another edge.

20. An optical disk according to claim 19, wherein a rate of change in power of said focused light beam which is emitted to form said data marks of said second group to data mark forming period of time is set within a range from −1.5 to −3.0 mW/µs.

21. An optical disk according to claim 15, wherein said waveform is digitized as a binary signal based on a predetermined threshold level.

22. An optical disk, comprising:

a surface from which data is adapted to be retrieved with a reproducing apparatus generating a focused light beam and a light beam spot having a predetermined size formed by said light beam;

a first group including a plurality of unit marks, each having a unit mark length, said unit marks being arranged such that said unit marks adjacent to each other are separated by a first blank length, said first blank and said unit marks being smaller than said beam spot size, said unit marks having a size sufficiently close in size to said beam spot size to be substantially circumscribed by said beam spot, said first blank length being shorter than said unit mark length; and a second group following said first group, said second group including a plurality of data marks which have data mark lengths, said data mark lengths being substantially integer multiples of said unit mark length, and said data marks adjacent to each other being separated by a second blank having a second blank length.

23. The optical disk according to claim 22, wherein said first blank length is equal to said second blank length.

24. The optical disk according to claim 22, wherein said first blank length is smaller than said second blank length.

25. The optical disk according to claim 22, wherein said marks include pits.

26. An optical disk according to any one of claims 1, 13, and 14, wherein said unit mark is sufficiently close in size to said beam spot size to be substantially circumscribed by said beam spot.

27. An optical disk according to any one of claims 5, and 9, wherein said first group marks are sufficiently close in size to said beam spot size to be substantially circumscribed by said beam spot.

* * * * *